United States Patent
Miyasako (10) Patent No.: US 9,264,616 B2
(45) Date of Patent: Feb. 16, 2016

(54) IMAGE CAPTURING APPARATUS, METHOD OF CONTROLLING THE SAME, AND STORAGE MEDIUM FOR CORRECTING IMAGE BLURRING OF A CAPTURED IMAGE

(71) Applicant: CANON KABUSHIKI KAISHA, Tokyo (JP)

(72) Inventor: Kenichi Miyasako, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 88 days.

(21) Appl. No.: 14/138,655

(22) Filed: Dec. 23, 2013

(65) Prior Publication Data
US 2014/0184834 A1  Jul. 3, 2014

(30) Foreign Application Priority Data
Dec. 27, 2012  (JP) ................... 2012-286172

(51) Int. Cl.
  *H04N 5/232*  (2006.01)
(52) U.S. Cl.
  CPC ......... *H04N 5/23261* (2013.01); *H04N 5/2328* (2013.01); *H04N 5/23254* (2013.01); *H04N 5/23258* (2013.01); *H04N 5/23264* (2013.01)
(58) Field of Classification Search
  None
  See application file for complete search history.

(56) References Cited

U.S. PATENT DOCUMENTS

| | | | | |
|---|---|---|---|---|
| 2006/0028554 A1* | 2/2006 | Usui | ................. | 348/208.99 |
| 2009/0244299 A1* | 10/2009 | Fukunishi | ................. | 348/208.4 |
| 2010/0158493 A1* | 6/2010 | Miyasako | ................. | 396/55 |
| 2011/0317024 A1* | 12/2011 | Miyasako | ................. | 348/208.11 |
| 2012/0033091 A1* | 2/2012 | Miyasako | ................. | 348/208.1 |
| 2012/0033092 A1* | 2/2012 | Sugaya | ................. | 348/208.1 |

FOREIGN PATENT DOCUMENTS

JP  2010-147857 A  7/2010

* cited by examiner

*Primary Examiner* — Justin P Misleh
(74) *Attorney, Agent, or Firm* — Carter, DeLuca, Farrell & Schmidt, LLP (57) ABSTRACT

An image capturing apparatus comprises a shake detection unit configured to detect a shake, a motion vector detection unit configured to detect a motion vector indicating movement of an image from a captured image signal, a motion vector output control unit configured to selectively output an output of the motion vector detection unit and an output of the shake detection unit, a correction amount calculation unit configured to calculate a shake correction amount based on at least one of the output of the motion vector output control unit and the output of the shake detection unit; and a correction unit configured to correct the image blurring of the captured image based on the shake correction amount.

8 Claims, 8 Drawing Sheets

IMAGE CAPTURING APPARATUS, METHOD OF CONTROLLING THE SAME, AND STORAGE MEDIUM FOR CORRECTING IMAGE BLURRING OF A CAPTURED IMAGE

BACKGROUND OF THE INVENTION

1. Field of the Invention

The present invention relates to a technique of mechanically or electronically correcting image blurring of a shot image caused by a shake of an image capturing apparatus.

2. Description of the Related Art

In recent years, along with a decrease in size of an image capturing apparatus and an increase in magnification of an optical system, a shake of an image capturing apparatus or the like becomes a large factor which reduces the quality of a shot image. In this regard, various image blurring correction functions of correcting image blurring of a captured image caused by a shake of an apparatus or the like are proposed.

In the image blurring correction function, if the movement of an image by a panning operation performed by a photographer to intentionally change the shooting range of the image capturing apparatus is corrected, the panning operation by the photographer is unwantedly hindered. The present applicant, therefore, proposes a function of detecting that the image capturing apparatus is in a panning state not to correct movement by a panning operation. For example, Japanese Patent Laid-Open No. 2010-147857 discloses an image capturing apparatus for detecting that it is in a panning state using a motion vector and a shake detection sensor for detecting a shake of the image capturing apparatus.

The aforementioned conventional example, however, has the following problems. While shooting is performed when a motion vector is not correctly detected, for example, while an object having a low contrast is shot, it may be impossible to correctly detect a panning operation. Furthermore, irrespective of panning detection, when a motion vector detection result is used for various other control operations, it may be impossible to correctly perform the control operations, thereby lowering the image blurring correction performance.

SUMMARY OF THE INVENTION

The present invention has been made in consideration of the above-described problems, and provides an image capturing apparatus which can correctly perform control at the time of panning or the like even if a motion vector is not correctly detected, thereby obtaining a good image blurring correction effect.

According to the first aspect of the present invention, there is provided an image capturing apparatus having a function of correcting image blurring of a captured image, comprising: a shake detection unit configured to detect a shake; a motion vector detection unit configured to detect a motion vector indicating movement of an image from a captured image signal; a motion vector output control unit configured to selectively output an output of the motion vector detection unit and an output of the shake detection unit; a correction amount calculation unit configured to calculate a shake correction amount based on at least one of the output of the motion vector output control unit and the output of the shake detection unit; and a correction unit configured to correct the image blurring of the captured image based on the shake correction amount.

According to the second aspect of the present invention, there is provided a method of controlling an image capturing apparatus having a function of correcting image blurring of a captured image, comprising: a shake detection step of detecting a shake; a motion vector detection step of detecting a motion vector indicating movement of an image from a captured image signal; a motion vector output control step of selectively outputting an output in the motion vector detection step and an output in the shake detection step; a correction amount calculation step of calculating a shake correction amount based on at least one of the output in the motion vector output control step and the output in the shake detection step; and a correction step of correcting the image blurring of the captured image based on the shake correction amount.

Further features of the present invention will become apparent from the following description of exemplary embodiments with reference to the attached drawings.

DESCRIPTION OF THE EMBODIMENTS

Embodiments of the present invention will be described in detail below with reference to the accompanying drawings. Note that image blurring correction control in one of the horizontal direction and the vertical direction of an image will be explained below. Image blurring correction control in the other direction is performed in the same manner and a description thereof will be omitted.

Figure 1:
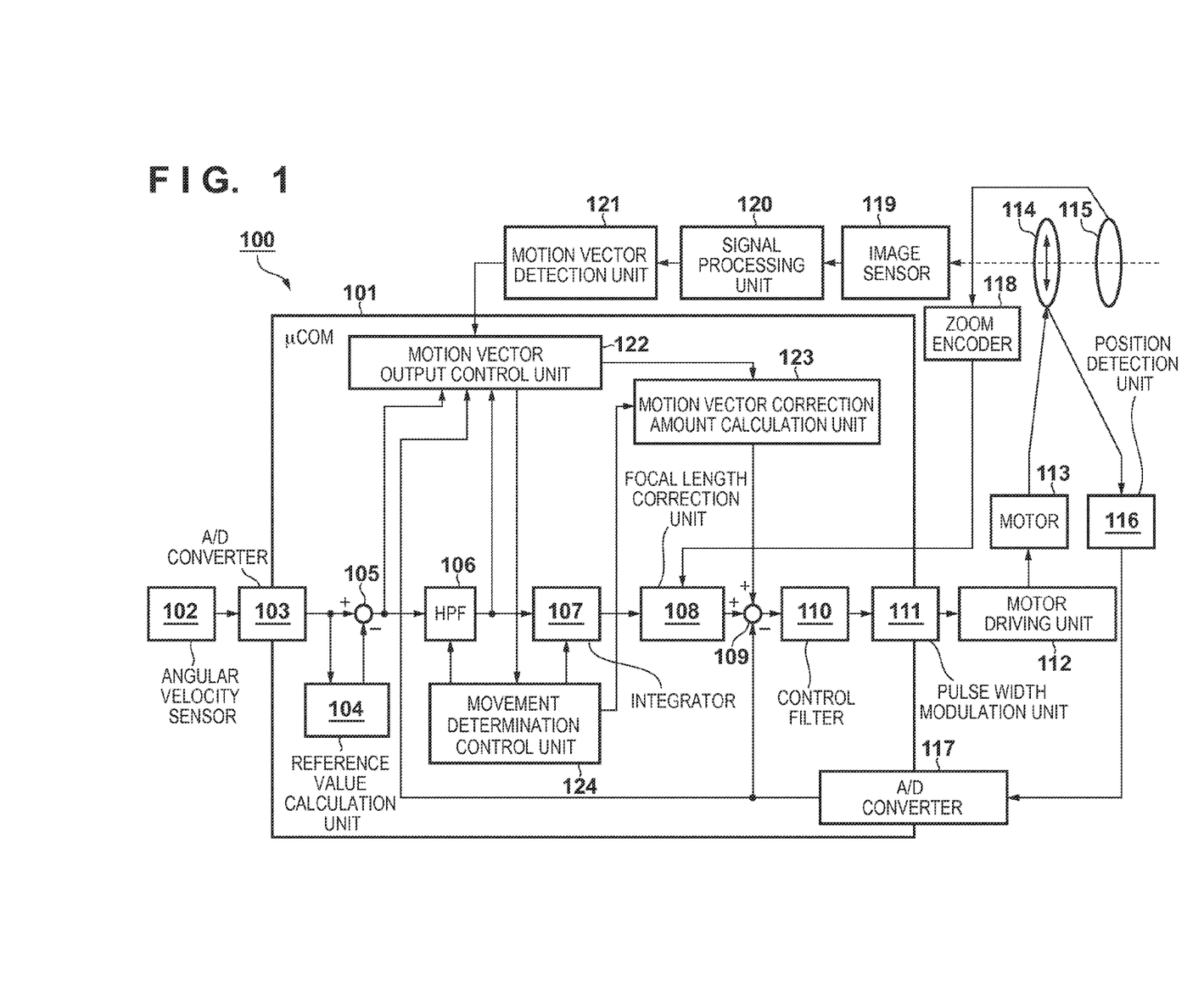
FIG. 1 is a block diagram showing the arrangement of a video camera as an embodiment of an image capturing apparatus according to the present invention.

FIG. 1 is a block diagram showing the arrangement of a video camera as an embodiment of an image capturing apparatus according to the present invention. The components of an image capturing apparatus 100 shown in FIG. 1 and their operations will be described in detail.

An angular velocity sensor 102 serving as a shake detection unit detects a shake acting on the image capturing apparatus 100 as an angular velocity signal, and supplies the angular velocity signal to an A/D converter 103. The A/D converter 103 converts (A/D-converts) the analog angular velocity signal from the angular velocity sensor 102 into a digital signal, and supplies the digital signal to a reference value calculation unit 104 and a subtractor 105 in a μCOM 101 (to be referred to as an angular velocity sensor signal hereinafter).

The angular velocity sensor 102 is, for example, a gyro sensor. When no vibration acts on the sensor, the output of the angular velocity sensor 102 changes depending on the environment. The angular velocity sensor signal is obtained by superimposing a change in output when no vibration acts on the sensor on a signal obtained when the angular velocity sensor 102 detects the shake amount of the image capturing apparatus 100. The reference value calculation unit 104 calculates an angular velocity sensor signal when no vibration acts on the angular velocity sensor 102 (a still state), that is, "reference value", and supplies it to the subtractor 105. To calculate a reference value, it is only necessary to use a known method such as a method which uses the average value of angular velocity sensor signals within a predetermined time. The subtractor 105 supplies the result of subtracting the reference value from the angular velocity sensor signal to an HPF (high-pass filter) 106 and a motion vector output control unit 122.

The HPF 106 has a function capable of changing its characteristic in an arbitrary frequency band. The HPF 106 cuts off low frequency components contained in angular velocity data from the subtractor 105 and outputs a signal in a high frequency band. Furthermore, when the reference value calculation result of the reference value calculation unit 104 is updated, the HPF 106 also controls to simultaneously update intermediate data held by itself so that a change amount from the past reference value does not appear in the output of the HPF 106. An integrator 107 has a function capable of changing its characteristic in an arbitrary frequency band. The integrator 107 integrates the output from the HPF 106, and supplies the result to a focal length correction unit 108.

A correction optical system 114 is, for example, a shift lens as part of an imaging optical system 115. The correction optical system 114 moves in a direction perpendicular to the optical axis to deflect the optical axis, thereby optically correcting image blurring of a captured image. The imaging optical system 115 includes a plurality of lenses, and can perform operations such as a zooming and focusing operations. The imaging optical system 115 forms an object image on an image sensor 119 through the correction optical system 114. A zoom encoder 118 detects the zoom position of the imaging optical system 115, and outputs it to the focal length correction unit 108 in the μCOM 101. The focal length correction unit 108 calculates the focal length of the imaging optical system 115 based on the output of the zoom encoder 118, and corrects the output of the integrator 107 to an optimal value for driving the correction optical system 114.

A position detection unit 116 detects the position of the correction optical system 114. An A/D converter 117 converts (A/D-converts) an analog signal output from the position detection unit 116 into a digital signal. An adder/subtractor 109 calculates deviation data by subtracting the position data of the correction optical system 114 digitized by the A/D converter 117 from a value obtained by adding the output of the focal length correction unit 108 to the output of a motion vector correction amount calculation unit 123. The deviation data as a result of calculation by the adder/subtractor 109 is supplied to a control filter 110.

The control filter 110 includes an amplifier for amplifying the deviation data by a predetermined gain, and a phase compensation filter. The deviation data supplied from the adder/subtractor 109 is supplied to the control filter 110. The control filter 110 performs signal processing by the amplifier and phase compensation filter for the deviation data supplied from the adder/subtractor 109, and outputs the result to a pulse width modulation unit 111. The pulse width modulation unit 111 modulates the data supplied through the control filter 110 to a waveform (that is, PWM waveform) which changes the duty ratio of a pulse wave, and supplies the waveform to a motor driving unit 112.

A motor 113 is a voice coil motor used to drive the correction optical system 114. When the motor driving unit 112 controls driving of the motor 113, the correction optical system 114 moves in a direction perpendicular to the optical axis. The position detection unit 116 includes a magnet and a Hall sensor provided at a position facing the magnet. The position detection unit 116 detects the moving amount of the correction optical system 114 in a direction perpendicular to the optical axis, and supplies the detection result to the above-described adder/subtractor 109 via the A/D converter 117. This constitutes a feedback control system which causes the moving amount of the correction optical system 114 in a direction perpendicular to the optical axis to follow the addition output of the focal length correction unit 108 and the motion vector correction amount calculation unit 123. The correction optical system 114 is, for example, a shift lens, and serves as a correction system which can optically correct a shake by moving in a direction perpendicular to the optical axis to deflect the optical axis (moving the image forming position). As a result, an image obtained by correcting the movement of an object on an imaging plane caused by a shake of the apparatus or the like is formed on the image sensor 119. The image sensor 119 converts the object image formed by the imaging optical system 115 into an electric signal as a captured image signal, and supplies the electric signal to a signal processing unit 120. The signal processing unit 120 generates a video signal complying with, for example, the NTSC format from the signal obtained by the image sensor 119, and supplies it to a motion vector detection unit 121.

The motion vector detection unit 121 detects a motion vector in an image based on a luminance signal included in the current video signal (frame image) generated by the signal processing unit 120 and a luminance signal included in a video signal (frame image) of the immediately preceding field stored in the image memory of the motion vector detection unit 121. The motion vector output detected by the motion vector detection unit 121 is supplied to the motion vector output control unit 122 in the μCOM 101.

The motion vector output control unit 122 is a block for performing most characteristic processing in this embodiment and a detailed description thereof will be provided later. The output of the motion vector output control unit 122 is supplied to the motion vector correction amount calculation unit 123 and a movement determination control unit 124.

The motion vector correction amount calculation unit 123 drives the correction optical system 114 by supplying the result obtained by performing predetermined calculation processing for the motion vector output to the adder/subtractor 109, thereby performing feedback control of suppressing the remaining image blurring correction amount. The motion vector correction amount calculation unit 123 includes an amplifier for amplifying the output of the motion vector output control unit 122 by a variable gain, and a phase compensation filter. As the changeable gain increases, an effect of suppressing the remaining image blurring correction amount becomes larger.

By using the output of the motion vector output control unit 122, the movement determination control unit 124 determines whether the image capturing apparatus 100 is in the panning state (an operation state in which the image capturing direction changes) and whether the image capturing apparatus 100 is shooting a fixed object while being held by hands.

If, for example, the calculation result obtained by using the output of the motion vector output control unit 122 is larger than a predetermined first threshold, the movement determination control unit 124 determines that the image capturing apparatus 100 is in the panning state. Note that the calculation result obtained by using the output of the motion vector output control unit 122 may be the output itself of the motion vector output control unit 122, or the result of performing calculation such as LPF processing for the output of the motion vector output control unit 122. That is, any signal may be used as long as the output of the motion vector output control unit 122 is used. If it is determined that the image capturing apparatus 100 is in the panning state, the movement determination control unit 124 performs at least one of control processing of increasing the cutoff frequency of the HPF 106 (increasing the amount of attenuation of a low frequency component), control processing of shortening the time constant of the integrator 107, and control processing of decreasing the gain of the motion vector correction amount calculation unit 123. This can cut off a movement component in a low frequency band generated by a panning operation, thereby preventing a malfunction which hinders a panning operation by a photographer. More specifically, the degree of image blurring correction for a detected shake (the followability of image blurring correction) is decreased by facilitating movement of the correction optical system 114 toward the center.

If, for example, a state in which the calculation result obtained by using the output of the motion vector output control unit 122 is smaller than a predetermined second threshold continues for a predetermined time or longer, the movement determination control unit 124 determines that the image capturing apparatus 100 is in the fixed point shooting state (a state in which the photographer holds the image capturing apparatus and shoots an object which moves little especially on the telephoto side). If it is determined that the image capturing apparatus 100 is in the fixed point shooting state, it can be assumed that the user does not make a large movement such as panning, and it is thus possible to correct image blurring of a moving image caused by a shake in a lower frequency band. Note that the calculation result obtained by using the output of the motion vector output control unit 122 may be the output itself of the motion vector output control unit 122 or the result of performing calculation such as LPF processing for the output of the motion vector output control unit 122. That is, any signal may be used as long as the output of the motion vector output control unit 122 is used. If it is determined that the image capturing apparatus 100 is in the fixed point shooting state, the movement determination control unit 124 performs at least one of control processing of decreasing the cutoff frequency of the HPF 106, control processing of prolonging the time constant of the integrator 107, and control processing of increasing the gain of the motion vector correction amount calculation unit 123. This makes it possible to correct, in the fixed point shooting state, image blurring of a moving image caused by a shake of the image capturing apparatus 100 in a low frequency band due to swinging of a body in shooting, thereby improving the image blurring correction performance.

Two embodiments of the motion vector output control unit 122 as a characteristic part of the embodiment of the present invention will be described.

(First Embodiment)

Figure 2A:
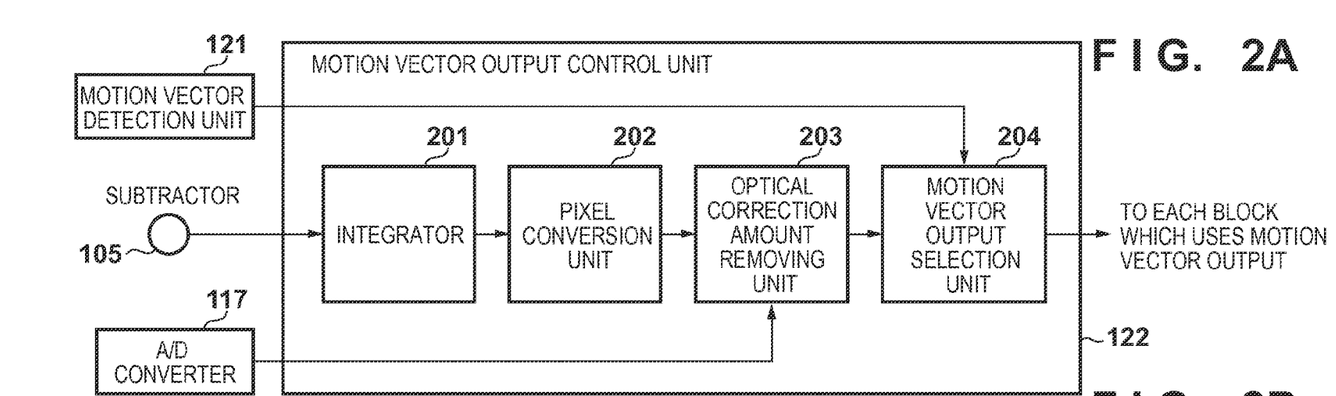
FIGS. 2A and 2B are block diagrams each showing an example of the arrangement of a motion vector output control unit 122.

FIG. 2A is a block diagram showing the arrangement of a motion vector output control unit 122 according to the first embodiment. The operation of the motion vector output control unit 122 will be described in detail below. Note that the same components as those shown in FIG. 1 have the same reference numerals and a description thereof will be omitted.

The motion vector output control unit 122 calculates an output (to be referred to as an angular velocity moving amount hereinafter) equivalent to a motion vector detection result using the output of an angular velocity sensor 102. The motion vector output control unit 122 has a function of outputting the angular velocity moving amount instead of the output of a motion vector detection unit 121 if it is estimated that the motion vector detection result of the motion vector detection unit 121 is incorrect.

An integrator 201, a pixel conversion unit 202, and an optical correction amount removing unit 203 are blocks for calculating the aforementioned angular velocity moving amount. The integrator 201 performs calculation to integrate the output of a subtractor 105, that is, data indicating an angular velocity, and convert the result into an angle. An integration period is made equal to an image update period during which the motion vector detection unit 121 detects a motion vector. For each image update period, the integrator 201 performs integration, and calculates a shake angle θ.

Using the shake angle θ for each image update period, the pixel conversion unit 202 calculates an image moving amount (to be referred to as a pre-correction angular velocity moving amount hereinafter) on an image sensor 119 corresponding to the shake angle θ for each image update period when an imaging optical system 115 does not perform image blurring correction. Let θ [rad] be the shake angle for each image update period, f [mm] be the focal length of the imaging optical system 115, and c [mm] be the cell pitch of the image sensor 119. Then, the pre-correction angular velocity moving amount [pixel] can be calculated by:

$$\text{pre-correction angular velocity moving amount} = f\theta/c \quad (1)$$

The optical correction amount removing unit 203 calculates the image blurring correction amount [pixel] for each image update period using the output of an A/D converter 117 indicating the position detection result of a correction optical system 114, and subtracts the calculated amount from the pre-correction angular velocity moving amount [pixel] supplied by the pixel conversion unit 202. The thus obtained calculation result indicates the remaining image blurring correction amount for each image update period, and is equivalent to the output of the motion vector detection unit 121. That is, this output indicates the above-described "angular velocity moving amount".

Figures 3A, 3B:
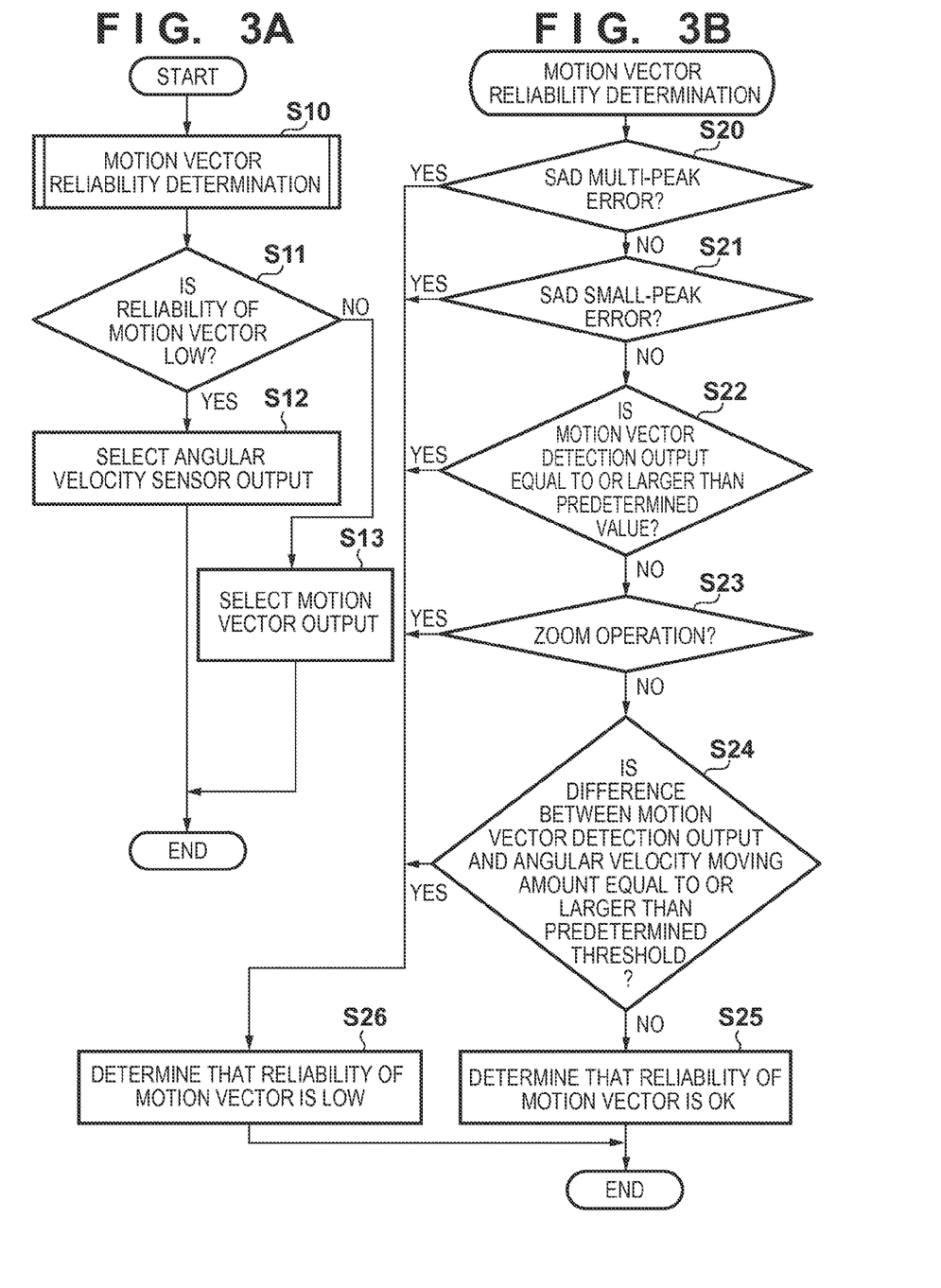
FIGS. 3A and 3B are flowcharts illustrating processing executed by a motion vector output selection unit 204.

FIG. 3A is a flowchart illustrating a processing procedure executed by a motion vector output selection unit 204. The processing of the flowchart shown in FIG. 3A is repeatedly performed for each image update period.

In step S10, the motion vector output selection unit 204 determines the reliability of the motion vector. The motion vector reliability determination processing will be described in detail later. If it is determined in step S11 that the reliability of the motion vector as a result of the reliability determination processing in step S10 is low, the process advances to step S12; otherwise, the process advances to step S13. The process then ends.

FIG. 3B is a flowchart illustrating the procedure of the motion vector reliability determination processing in step S10. Although a description will be provided in this embodiment on the assumption that all processes in steps S20 to S24 are performed, the present invention is not limited to this. For example, only one of the processes in steps S20 to S24 may be performed or a plurality of arbitrary processes may be combined and performed.

In step S20, the motion vector output selection unit 204 determines whether a SAD (Sum of Absolute Differences) multi-peak error has occurred in the motion vector detection unit 121. The SAD multi-peak error will now be explained.

The motion vector detection unit 121 divides the luminance data of the current image and that of a past image into a plurality of blocks, respectively, calculates an image moving amount for each block, and statistically processes the image moving amount calculated for each block, thereby calculating a final motion vector. That is, a block matching method is used.

Figure 4A:
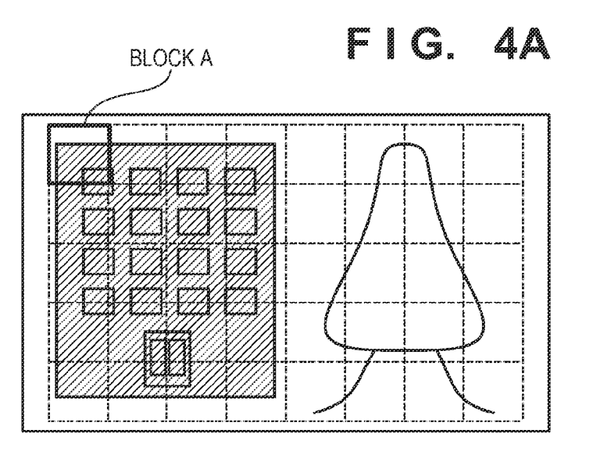
FIGS. 4A to 4E are views for explaining a motion vector detection method used by a motion vector detection unit 121.
Figure 4B:
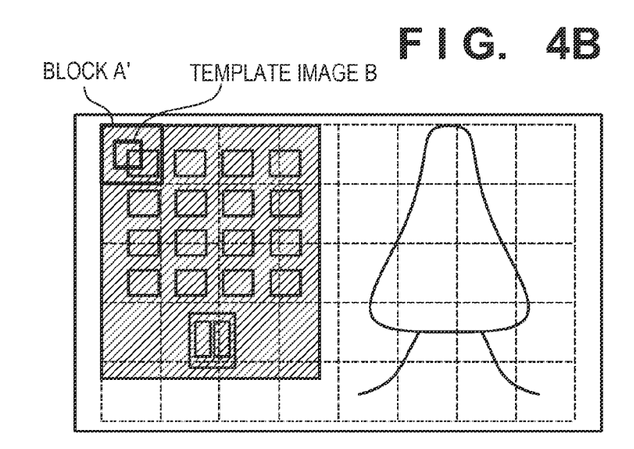

FIG. 4A is a view showing an example of division into a plurality of blocks. FIG. 4A shows a case in which an image used to detect a motion vector is divided into 8×5 blocks, as indicated by dotted lines. FIG. 4B shows an image (future image) next to that shown in FIG. 4A. The position of an object shown in FIG. 4B has moved in the upper left direction with respect to the position of an object shown in FIG. 4A by the influence of a shake acting on the image capturing apparatus.

Figure 4C:
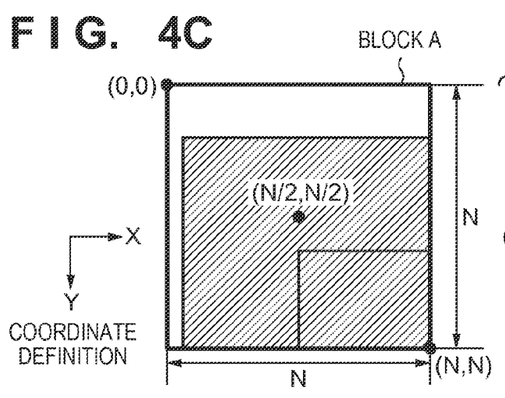
Figure 4D:
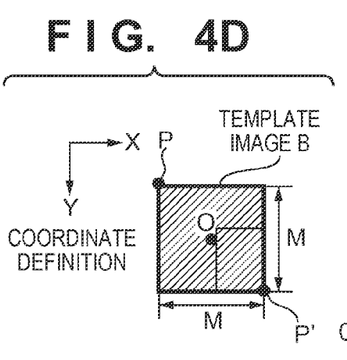

FIGS. 4C and 4D are views for explaining a method of calculating an image moving amount in a block A shown in FIG. 4A. To calculate the image moving amount in the block A, as shown in FIG. 4B, an image which is included in a block A' corresponding to the block A, is smaller than the block A' and has the same center position as that of the block A', is set as a template image B. Note that the block A and the template image B are square image data, and have sides of lengths N and M (N>M), respectively, as shown in FIGS. 4C and 4D. For the sake of simplicity, the coordinates of the image are defined by setting the upper left corner of the image of the block A as an origin (0, 0), the horizontal direction as an X-axis, and the vertical direction as a Y-axis.

Figure 4E:
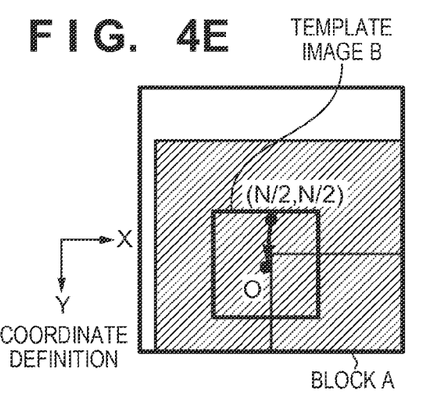

Calculation of the image moving amount is performed according to the following procedure. That is, the images are superimposed so that the position of a point P shown in FIG. 4D coincides with the origin (0, 0) shown in FIG. 4C, and the total of differences in luminance value in all pixels (sum of absolute differences=SAD) is calculated. Note that "SAD" indicates the sum of absolute differences between the luminance values in all the pixels. A SAD is calculated at each position until a point P' shown in FIG. 4D coincides with the coordinate position (N, N) shown in FIG. 4C while moving the position of the template image B by one pixel in the X and Y directions, respectively. As the degree of coincidence of the images is higher, the SAD is smaller. It is, therefore, possible to calculate the image moving amount by obtaining a position where the SAD becomes smallest. FIG. 4E shows the positional relationship between the block A and the template image B when the SAD is smallest. The difference between the center coordinate position (N/2, N/2) of the block A shown in FIG. 4E and the center coordinate position O of the template image B indicates the image moving amount in the block A. Note that since the template image is moved within the range of the image of the block A, the image of the block A will be referred to as a search image hereinafter.

FIGS. 5A to 5D are graphs showing an example of a change in SAD in the X direction. Although the SAD is actually a two-dimensional map in the X and Y directions, the SAD in only the X direction will be described for the sake of simplicity. In the graphs shown in FIG. 5A to 5D, a moving amount when the X coordinate of the center position of the template image coincides with that of the center position of the search image is set to 0, the abscissa represents the number of pixels across which the template image moved, and the ordinates represents the SAD calculation result. The maximum moving amount of the template image depends on the size of the search image and that of the template image. For the images shown in FIGS. 4C and 4D, the moving amount falls within the range of ±(N−M)/2.

Figure 5A:
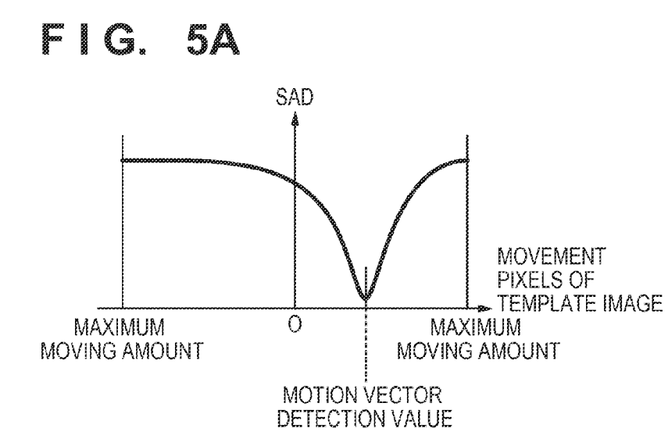
FIGS. 5A to 5D are graphs for explaining a method of calculating an image moving amount using a SAD (Sum of Absolute Differences) by the motion vector detection unit 121.

How the SAD changes according to movement of the template image changes depending on a shot image. For example, in a block where an object having a high contrast is captured, the difference in luminance value is close to 0 when the pattern of the search image coincides with that of the template image. As shown in FIG. 5A, therefore, the difference between the maximum value and minimum value of the SAD is significant, and the accuracy of the image moving amount calculation result is high.

Figure 5B:
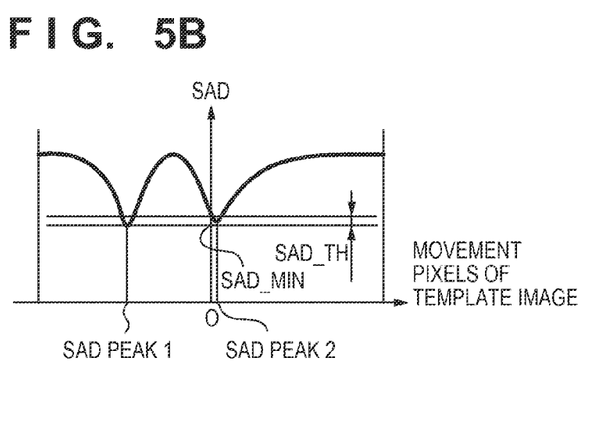

In a block where an object including a repeated pattern such as a tile pattern is captured, however, there are a plurality of positions where the pattern of the search image coincides with that of the template image. As shown in FIG. 5B, therefore, there are a plurality of positions where the SAD becomes close to a minimum value, and the accuracy of the image moving amount calculation result is low.

Figure 5C:
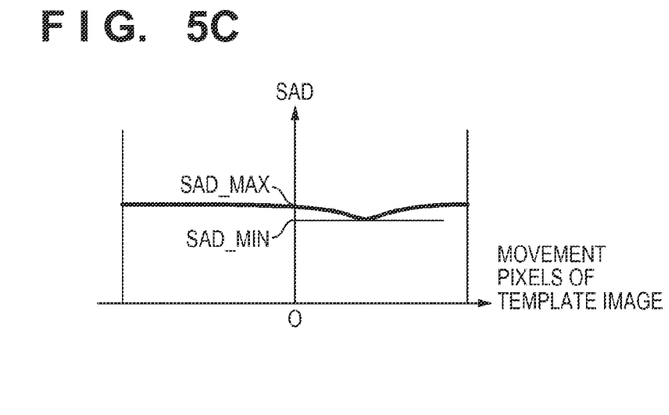

Furthermore, in a block where an object such as sky having a low contrast is captured, the degree of coincidence of the search image and the template image is low. As shown in FIG. 5C, therefore, the difference between the maximum value and minimum value of the SAD is small, and the accuracy of the image moving amount calculation result is low.

Figure 5D:
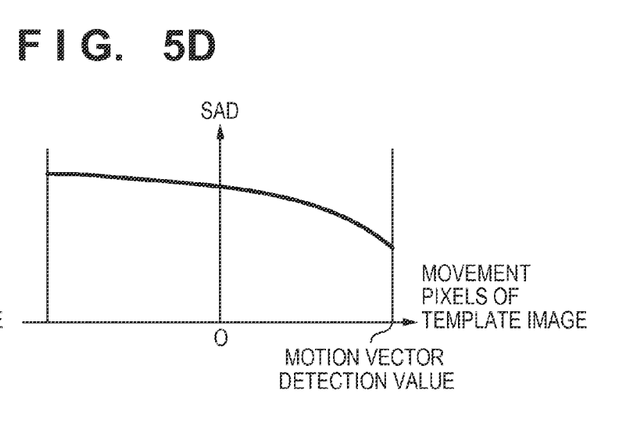

In a block where an object having gradation in one direction is captured, the SAD monotonously decreases/increases as the template image moves, as shown in FIG. 5D. Therefore, the image moving amount is very large, and the accuracy of the calculation result is low.

As shown in FIG. 5B, "SAD multi-peak error" indicates that the number of blocks where a plurality of peaks of the SAD appear exceeds a predetermined number. More specifically, whether a plurality of peaks of the SAD appear is determined by determining, based on the minimum value (SAD_MIN) of the SAD, whether there are two or more local minimum values (peaks) of the SAD, which are equal to or smaller than a predetermined threshold (SAD_TH). This determination processing is performed for all the blocks shown in FIG. 4A. If the number of blocks for which it is determined that a plurality of peaks of the SAD appear exceeds the predetermined number (for example, 70% or more of the total number of blocks), the SAD multi-peak error is determined in step S20.

If the SAD multi-peak error is determined in step S20, the process advances to step S26 to determine that the reliability of the motion vector is low, thereby terminating the process. If the SAD multi-peak error is not determined in step S20, the process advances to step S21.

In step S21, the motion vector output selection unit 204 determines whether a "SAD small-peak error" has occurred in the motion vector detection unit 121. The SAD small-peak error will be described.

The "SAD small-peak error" indicates that the number of blocks where the difference between the maximum value and minimum value of the SAD is smaller than the threshold, as shown in FIG. 5C, exceeds a predetermined number. That is, whether the difference between the maximum value (SAD_MAX) of the SAD and the minimum value (SAD_MIN) of the SAD is smaller than the threshold is determined for all the blocks shown in FIG. 4A. If it is determined that the number of blocks where the difference between the maximum value and minimum value of the SAD is smaller than the threshold exceeds the predetermined number (for example, 70% or more of the total number of blocks), the SAD small-peak error is determined in step S21.

If the SAD small-peak error is determined in step S21, the process advances to step S26 to determine that the reliability of the motion vector is low, thereby terminating the process. If the SAD small-peak error is not determined in step S21, the process advances to step S22.

In step S22, the motion vector output selection unit 204 determines whether the magnitude of the motion vector detection output is equal to or larger than a predetermined value. If the magnitude of the motion vector detection output is equal to or larger than the predetermined value, it is highly probable that the motion vector detection output is incorrect, as described with reference to FIG. 5D. If the motion vector output selection unit 204 determines in step S22 that the magnitude of the motion vector detection output is equal to or larger than the predetermined value, the process advances to step S26 to determine that the reliability of the motion vector is low, thereby terminating the process. Alternatively, if the motion vector output selection unit 204 determines in step S22 that the magnitude of the motion vector detection output is smaller than the predetermined value, the process advances to step S23.

Figure 6A:
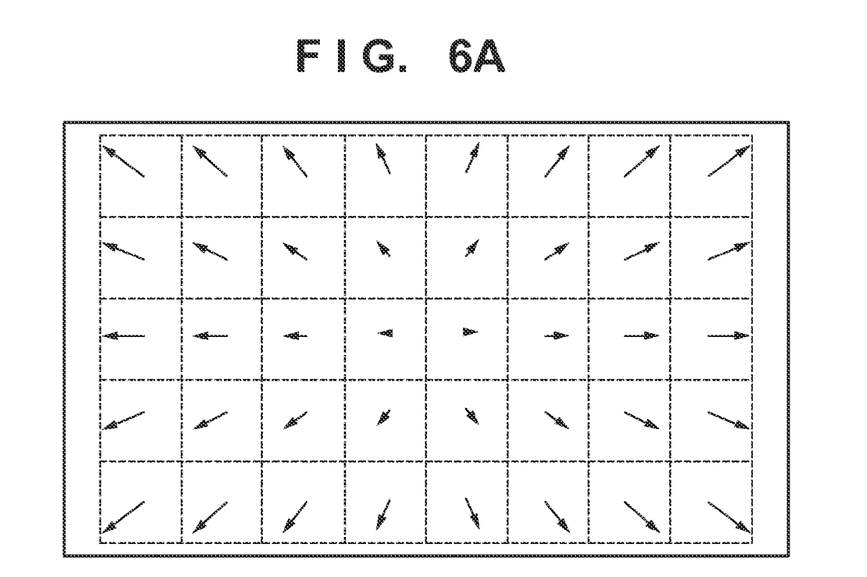
FIGS. 6A and 6B are views for explaining processing in steps S23 and S24 of the flowchart shown in FIG. 3B.

In step S23, the motion vector output selection unit 204 determines whether the image capturing apparatus is performing a zoom operation. FIG. 6A shows an example of an image moving amount calculation result in each motion vector detection block during a zoom operation. As is apparent from FIG. 6A, during the zoom operation, the output of the motion vector detection unit 121 is completely different from an image moving amount caused by a shake of the image capturing apparatus. If, therefore, the motion vector output selection unit 204 determines in step S23 that the image capturing apparatus is performing a zoom operation, the process advances to step S26 to determine that the reliability of the motion vector is low, thereby terminating the process. On the other hand, if the motion vector output selection unit 204 determines in step S23 that the image capturing apparatus is not performing a zoom operation, the process advances to step S24.

Figure 6B:
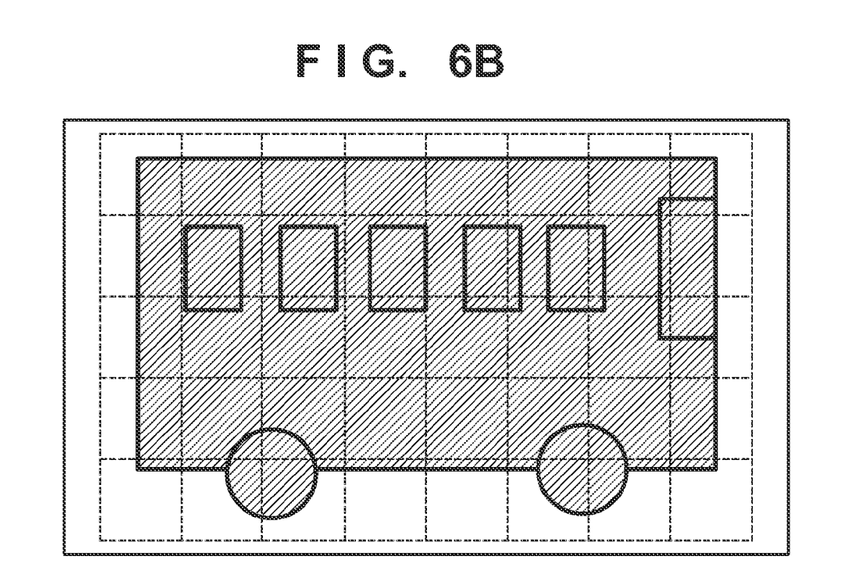

In step S24, the motion vector output selection unit 204 determines whether the difference between the output of the motion vector detection unit 121 and the above-described angular velocity moving amount is equal to or larger than a predetermined threshold. In the processing of step S24, as shown in FIG. 6B, when shooting a moving object such as a car, the output of the motion vector detection unit 121 does not often coincide with an image moving amount caused by a shake of the image capturing apparatus. In the processing of step S24, therefore, when shooting a moving object such as a car, the motion vector output selection unit 204 determines that the reliability of the motion vector is low.

Figure 7A:
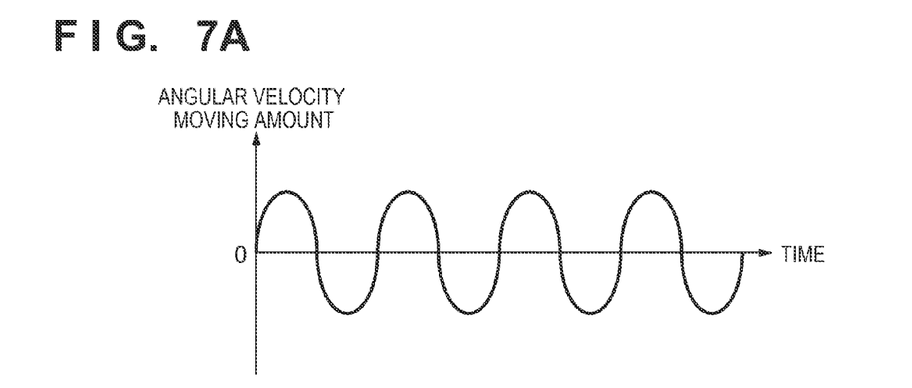
FIGS. 7A to 7C are graphs for explaining the processing in step S24 of the flowchart shown in FIG. 3B.
Figure 7B:
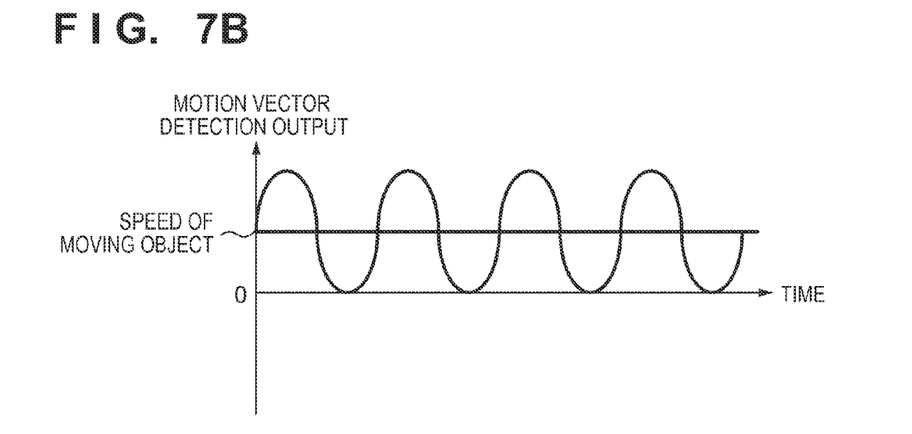
Figure 7C:
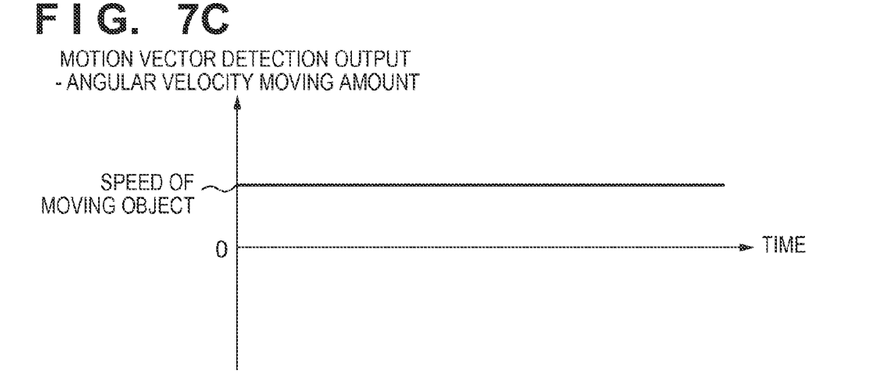

FIGS. 7A to 7C are graphs showing changes in various signals with time while a moving object shown in FIG. 6B is shot. FIG. 7A is a graph showing a change in angular velocity moving amount with time, in which the abscissa represents time and the ordinate represents the angular velocity moving amount as the output of the optical correction amount removing unit 203. FIG. 7B is a graph showing a change in motion vector detection output with time, in which the abscissa represents time and the ordinate represents the output of the motion vector detection unit 121. FIG. 7C is a graph showing a change in difference between the motion vector detection output shown in FIG. 7B and the angular velocity moving amount shown in FIG. 7A with time, in which the abscissa represents time and the ordinate represents the difference.

In the graph shown in FIG. 7A, the angular velocity moving amount indicating the image moving amount calculated based on the output of the angular velocity sensor 102 becomes a waveform which changes between positive and negative values with respect to 0 as the center. To the contrary, in the graph shown in FIG. 7B, since movement of the object is also detected, the motion vector detection output becomes a waveform obtained by superimposing a change in angular velocity moving amount shown in FIG. 7A on an output indicating the moving speed of the object. As shown in FIG. 7C, therefore, the difference between the motion vector detection output and the angular velocity moving amount is an output indicating the moving speed of the object. If it is determined in step S24 that the difference between the output of the motion vector detection unit 121 and the angular velocity moving amount is equal to or larger than the predetermined threshold, the motion vector output selection unit 204 determines that the reliability of the motion vector is low, thereby terminating the process. If the motion vector output selection unit 204 determines in step S24 that the difference between the output of the motion vector detection unit 121 and the angular velocity moving amount is smaller than the predetermined threshold, the process advances to step S25. In step S25, the motion vector output selection unit 204 determines that there is no problem in terms of the reliability of the motion vector and the process ends.

As described above, in the processing of the motion vector output control unit 122, it is possible to selectively output the output of the motion vector detection unit 121 and the angular velocity moving amount calculated based on the angular velocity sensor 102. Since the angular velocity moving amount includes noise of the angular velocity sensor 102 and an error in shake detection sensitivity, the motion vector detection output includes an image moving amount detection error smaller than that of the angular velocity moving amount. The reliability of the motion vector detection output, however, varies depending on the object. It is, therefore, possible to overcome the drawback of the motion vector detection output by executing the processing of the motion vector output control unit 122 to selectively output the output of the motion vector detection unit 121 and the angular velocity moving amount calculated based on the angular velocity sensor 102 in accordance with the reliability determination result of the motion vector detection unit 121. This realizes effects to be described below.

Instead of using the output of the motion vector detection unit 121 intact, a motion vector correction amount calculation unit 123 uses the output of the motion vector output control unit 122 to selectively use the output of the motion vector detection unit 121 and the angular velocity moving amount calculated based on the angular velocity sensor 102. This can prevent deterioration of the image blurring correction performance when it is impossible to correctly detect a motion vector and a phenomenon in which the movement of a moving object is unwantedly corrected, thereby achieving higher image blurring correction performance.

Similarly, instead of using the output of the motion vector detection unit 121 intact, a movement determination control unit 124 uses the output of the motion vector output control unit 122 to selectively use the output of the motion vector detection unit 121 and the angular velocity moving amount calculated based on the angular velocity sensor 102. This can prevent image blurring correction which hinders a panning operation, when it is impossible to correctly detect a motion vector. Furthermore, it is possible to prevent a phenomenon in which the movement of a moving object is erroneously determined as panning to cause deterioration of the fixed point shooting performance, thereby achieving higher image blurring correction performance.

(Second Embodiment)

Figure 2B:
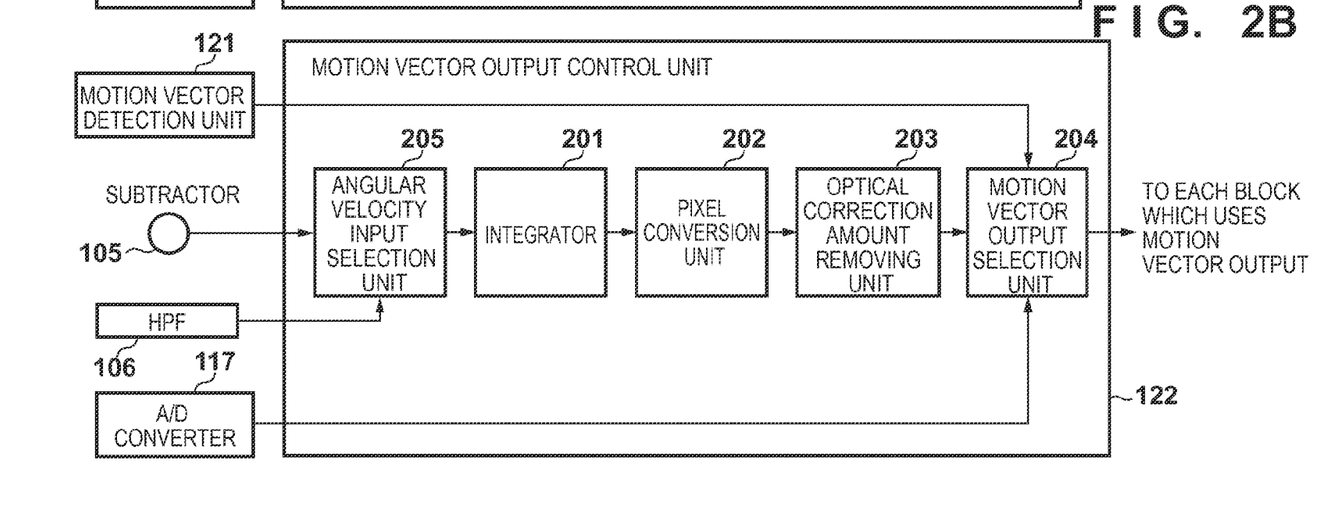

FIG. 2B is a block diagram showing the arrangement of a motion vector output control unit 122 according to the second embodiment. The operation of the motion vector output control unit 122 will be described in detail below. Note that the same components as those shown in FIGS. 1 and 2A have the same reference numerals and a description thereof will be omitted.

FIG. 2B is a block diagram in which an angular velocity input selection unit 205 is added before an integrator 201, as compared with FIG. 2A. The angular velocity input selection unit 205 selects one of the output of a subtractor 105 and that of an HPF 106, and supplies the selected output to the integrator 201.

Figure 8:
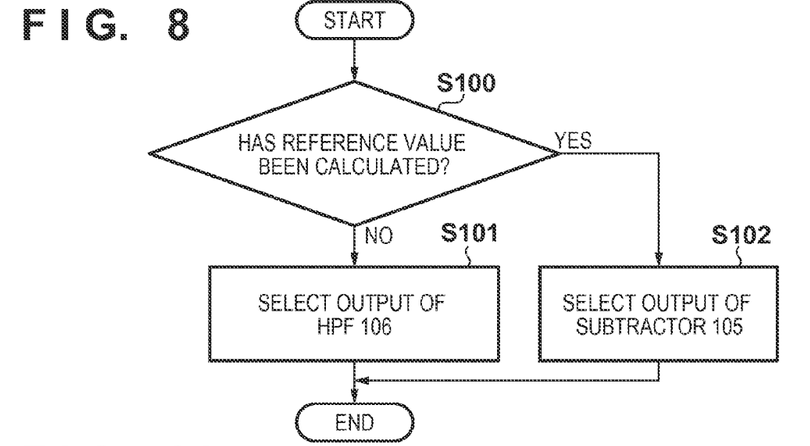
FIG. 8 is a flowchart illustrating processing executed by an angular velocity input selection unit 205.

FIG. 8 is a flowchart illustrating a processing procedure executed by the angular velocity input selection unit 205. In step S100, the angular velocity input selection unit 205 determines whether a reference value calculation unit 104 has calculated a reference value at least once after power-on of an image capturing apparatus. If YES is determined in step S100, the process advances to step S102, and the angular velocity input selection unit 205 selects the output of the subtractor 105 as its output, thereby terminating the process. If NO is determined in step S100, the process advances to step S101, and the angular velocity input selection unit 205 selects the output of the HPF 106 as its output, thereby terminating the process.

Figure 9A:
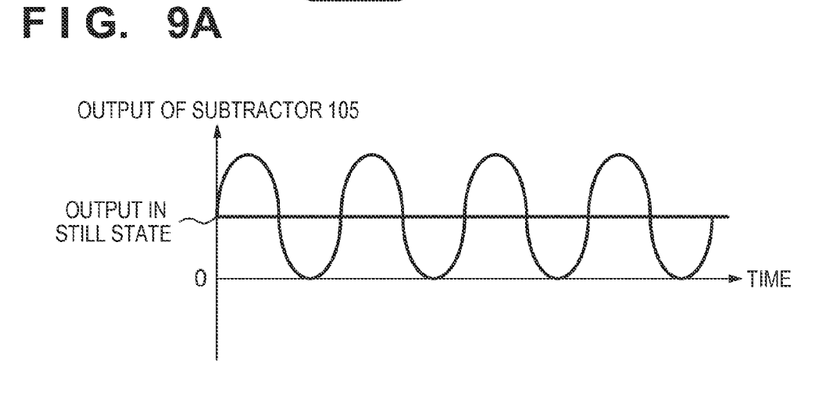
FIGS. 9A and 9B are graphs for explaining the processing executed by the angular velocity input selection unit 205.
Figure 9B:
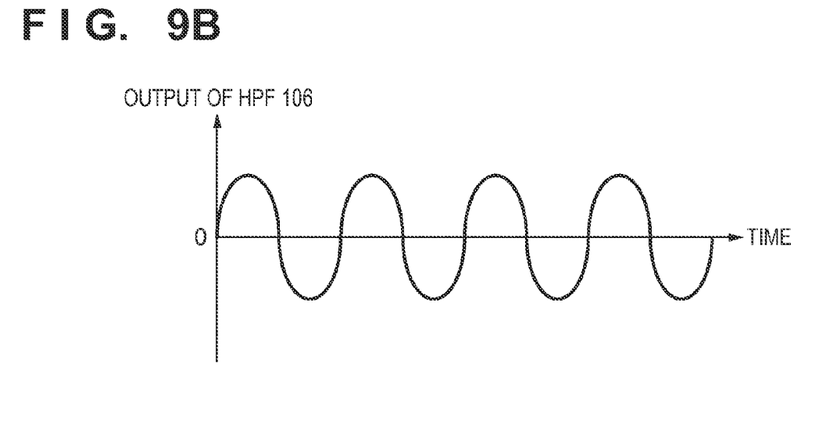

FIGS. 9A and 9B are graphs respectively showing a change in output of the subtractor 105 with time and a change in output of the HPF 106 with time before the reference value calculation unit 104 calculates a reference value. In the graph shown in FIG. 9A, the abscissa represents time and the ordinate represents the output of the subtractor 105. In the graph shown in FIG. 9B, the abscissa represents time and the ordinate represents the output of the HPF 106. When the image capturing apparatus stays still, the output of an angular velocity sensor 102 includes an offset component which changes depending on an environment or the like, and is very unlikely to become zero. Before the reference value calculation unit 104 calculates a reference value, therefore, the output of the subtractor 105 does not change with respect to zero as the center even while a fixed point is shot, as shown in FIG. 9A. On the other hand, since the output of the HPF 106 cuts off a DC component, it is possible to extract a shake component acting on the image capturing apparatus, as shown in FIG. 9B, even if it is impossible to correctly calculate a reference value.

As described above, in the processing of the motion vector output control unit 122 according to this embodiment, a signal used to calculate an angular velocity moving amount can be selected from the output of the subtractor 105 and that of the HPF 106. Since the output of the HPF 106 includes an error such as a phase delay of the filter, the output of the subtractor 105 includes an image moving amount detection error smaller than that of the output of the HPF 106. The output of the subtractor 105, however, includes an offset component before the reference value calculation unit 104 calculates a reference value. It is, therefore, possible to overcome the drawback of the output of the subtractor 105 by using the output of the HPF 106 as a signal used by the motion vector output control unit 122 to calculate an angular velocity moving amount before the reference value calculation unit 104 calculates a reference value. This can prevent deterioration of the image blurring correction performance even if the reliability of the motion vector detection result of the motion vector detection unit 121 is low before the reference value calculation unit 104 calculates a reference value.

The present invention has been described in detail based on the preferred embodiments. However, the present invention is not limited to the specific embodiments, and includes various modes without departing from the spirit and scope thereof. Parts of the above-described embodiments may be combined, as needed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-286172, filed Dec. 27, 2012, which is hereby incorporated by reference herein in its entirety.

What is claimed is:

1. An image capturing apparatus having a function of correcting image blurring of a captured image, comprising:
    a motion vector detection unit configured to detect a motion vector indicating movement of an image from a captured image signal;
    a motion vector output control unit configured to selectively output an output of the motion vector detection unit and an output of a shake detection unit;
    a correction amount calculation unit configured to calculate a shake correction amount based on at least one of the output of the motion vector output control unit and the output of the shake detection unit;
    a correction unit configured to correct the image blurring of the captured image based on the shake correction amount; and
    a reference value calculation unit configured to calculate a reference value as the output of the shake detection unit,
    wherein the motion vector output control unit selectively outputs the output of the motion vector detection unit and a value based on a moving amount of an object on an imaging plane calculated based on an output obtained by integrating a difference between the output of the shake detection unit and the reference value.

2. The image capturing apparatus according to claim 1, further comprising:
    a control unit configured to determine based on the output of the motion vector control unit whether an operation of changing an image capturing direction of the image capturing apparatus is in progress, and change, if the operation of changing the image capturing direction of the image capturing apparatus is in progress, calculation of the correction amount calculation unit so that an amount of attenuation in a low frequency band becomes larger.

3. The image capturing apparatus according to claim 1, further comprising:
    a control unit configured to determine based on the output of the motion vector control unit whether the image capturing apparatus is in a fixed point shooting state, and change, if the image capturing apparatus is in the fixed point shooting state, calculation of the correction amount calculation unit so that an amount of attenuation in a low frequency band becomes smaller.

4. The image capturing apparatus according to claim 1, wherein the reference value is the output of the shake detection unit when the image capturing apparatus is in a still state.

5. The image capturing apparatus according to claim 4, wherein if it is determined that reliability of the output of the motion vector detection unit is low, the motion vector output control unit selects and outputs the calculation result calculated based on the output of the shake detection unit, and if it is not determined that the reliability of the output of the motion vector detection unit is low, the motion vector output control unit selects and outputs the output of the motion vector detection unit.

6. The image capturing apparatus according to claim 5, wherein the motion vector detection unit divides the captured image into a plurality of blocks, and calculates a motion vector for each block using a sum of absolute differences between luminance data of a current frame image and luminance data of a past frame image, and
wherein the motion vector output control unit determines that the reliability of the output of the motion vector detection unit is low in at least one of a case in which the number of blocks where a difference between a maximum value and a minimum value of the sum of absolute differences is smaller than a predetermined value exceeds a predetermined number, a case in which the number of blocks where the sum of absolute differences is close to the minimum value at a plurality of points exceeds a predetermined number, a case in which the image capturing apparatus is performing a zoom operation, a case in which the output of the shake detection unit is not smaller than a predetermined magnitude, and a case in which a difference between the output of the motion vector detection unit and the calculation result calculated based on the output of the shake detection unit is not smaller than a predetermined value.

7. The image capturing apparatus according to claim 4, further comprising:

a low frequency component attenuation unit configured to attenuate a low frequency component of the output of the shake detection unit,
wherein the motion vector output control unit selectively outputs the output of the motion vector detection unit and a value based on a moving amount of the object on the imaging plane calculated based on an output obtained by integrating the output of the low frequency component attenuation unit until the reference value calculation unit calculates a reference value for the first time after power-on of the image capturing apparatus.

8. A method of controlling an image capturing apparatus having a function of correcting image blurring of a captured image, comprising:
detecting a shake;
detecting a motion vector indicating movement of an image from a captured image signal;
selectively outputting an output in the detecting of the motion vector and a calculation result calculated based on an output in the detecting of the shake;
calculating a shake correction amount based on at least one of the output in the outputting and the output in the detecting of the shake;
correcting the image blurring of the captured image based on the shake correction amount; and
calculating a reference value as the output in the detecting of the shake,
wherein in the outputting, the output in detecting of the motion vector and a value based on a moving amount of an object on an imaging plane calculated based on an output obtained by integrating a difference between the output in the detecting of the shake and the reference value are selectively output.

* * * * *